(12) United States Patent
Park et al.

(10) Patent No.: US 10,507,438 B2
(45) Date of Patent: Dec. 17, 2019

(54) COMPOSITE MEMBRANE AND METHOD OF MANUFACTURING THE SAME

(71) Applicant: GWANGJU INSTITUTE OF SCIENCE AND TECHNOLOGY, Gwangju (KR)

(72) Inventors: Ji-Woong Park, Gwangju (KR); Jae-Sung Bae, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 76 days.

(21) Appl. No.: 15/360,420

(22) Filed: Nov. 23, 2016

(65) Prior Publication Data

US 2017/0144114 A1    May 25, 2017

(30) Foreign Application Priority Data

Nov. 23, 2015  (KR) ........................ 10-2015-0163828

(51) Int. Cl.
*B01D 71/82* (2006.01)
*B05D 1/30* (2006.01)
*B05D 1/00* (2006.01)
*B05D 1/02* (2006.01)
*B01D 69/12* (2006.01)
*B05D 1/18* (2006.01)

(52) U.S. Cl.
CPC ........... *B01D 71/82* (2013.01); *B01D 69/125* (2013.01); *B01D 2323/30* (2013.01); *B01D 2325/02* (2013.01); *B01D 2325/04* (2013.01)

(58) Field of Classification Search
CPC ............ B01D 2315/08; B01D 2323/30; B01D 2325/02; B01D 2325/04; B01D 69/02; B01D 69/125; B01D 69/141; B01D 71/82
See application file for complete search history.

(56) References Cited

U.S. PATENT DOCUMENTS

| 4,980,062 A | * | 12/1990 | Block | ................ | B01D 67/0048 |
| | | | | | 210/490 |
| 2012/0095123 A1 | * | 4/2012 | Park | ................... | C08G 18/3243 |
| | | | | | 521/163 |
| 2013/0004309 A1 | * | 1/2013 | Sambasivan | .......... | C04B 35/195 |
| | | | | | 415/208.1 |

OTHER PUBLICATIONS

[Supportive Materials for Exception to Loss of Novelty] Park, Ji-Woong et al, "One-Pot Preparation of Monolithic Molecular Separation Membranes with Sub-10 nm Reticulated Pores Using Concentration-Polarization-Induced Gelation of Covalent Network Nanoparticles", Published on Aug. 27, 2015.

* cited by examiner

*Primary Examiner* — Dirk R Bass
(74) *Attorney, Agent, or Firm* — Hauptman Ham, LLP

(57) ABSTRACT

Disclosed are a composite membrane and a method of manufacturing the same. More particularly, disclosed are a composite membrane, which includes a porous support and an active layer deposited on a surface of the porous support, and a method of manufacturing the composite membrane using concentration polarization of a network-nanoparticle-dispersed organic sol-containing solution on a surface of the porous support.

3 Claims, 3 Drawing Sheets

COMPOSITE MEMBRANE AND METHOD OF MANUFACTURING THE SAME

CROSS REFERENCE TO RELATED APPLICATION

This application claims the benefit of Korean Patent Application No. 10-2015-0163828, filed on Nov. 23, 2015, entitled "COMPOSITE MEMBRANE AND METHOD OF MANUFACTURING THE SAME", which is hereby incorporated by reference in its entirety into this application.

BACKGROUND

1. Technical Field

The present invention relates to a composite membrane and a method of manufacturing the same, and more particularly, to a micropore-containing composite membrane, which can be manufactured to a large area by a simple process, and a method of manufacturing the same.

2. Description of the Related Art

Membranes can be classified into porous membranes, dense membranes, and composite membranes, depending upon structures thereof.

Among the membranes, composite membranes include an active layer determining separation efficiency, and a porous support capable of minimizing resistance to permeation materials and maintaining pore characteristics and mechanical strength of the composite membranes. The composite membranes may include an active layer of a low thickness to reduce resistance to the fluid passing therethrough, thereby providing selectivity and excellent permeation performance and significantly contributing to practical applications of the membranes due to a merit of adjustability of selectivity and permeability.

Therefore, studies into manufacturing a novel composite membrane for various applications are being carried out.

In the related art, although a method of manufacturing a phase separation-based nano-porous composite membrane is well-known in the art, since it is difficult for a homopolymer blend in a solution or molten state to prevent a phase-separated domain from being gradually coarsened and becoming larger due to high mobility of soft materials, it is difficult to obtain a porous active layer having a pore size of 10 nm or less.

As other methods of manufacturing a composite membrane, methods of manufacturing a composite membrane are also known in the art. In these methods, a porous active layer having a pore size of 10 nm or less can be obtained through self-assembly of a block copolymer, chemical vapor deposition of carbon nanotubes, or deposition of nanoparticles. However, in these methods, since it is difficult to manufacture a large-size composite membrane or a composite membrane exhibits low dimensional stability, the composite membrane cannot be used at high temperatures or in various solvents.

Therefore, the inventors of the present invention have conceived the present invention by paying attention to research results showing that an active layer including pores having a size of 10 nm or less can be manufactured by a simple process using concentration polarization of anorganic sol of reactive, nano-particulate covalent networks on the surface of a porous support and can be applied to a manufacturing process of a large-area composite membrane.

BRIEF SUMMARY

The present invention has been conceived to solve the problems as set forth above, and it is an aspect of the present invention to provide a composite membrane including micropores.

It is another aspect of the present invention to provide a method of manufacturing the composite membrane as set forth above.

In accordance with one aspect of the present invention, a composite membrane includes: (i) a porous support: and (ii) a monolithic active layer deposited on the porous support and having a 3-dimensionally interconnected nanopore structure having a size of 10 nm or less.

In accordance with another aspect of the present invention, a method of manufacturing a composite membrane includes (B) performing permeation or coating of a nanoparticle-dispersed organic sol-containing solution on the porous support.

According to the present invention, the composite membrane can remove small-size materials by the microporous structures comprised of 3-dimensional covalent network in the active layer, and the composite membranes can be manufactured to a large area by a simple process.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION

Figure 1:
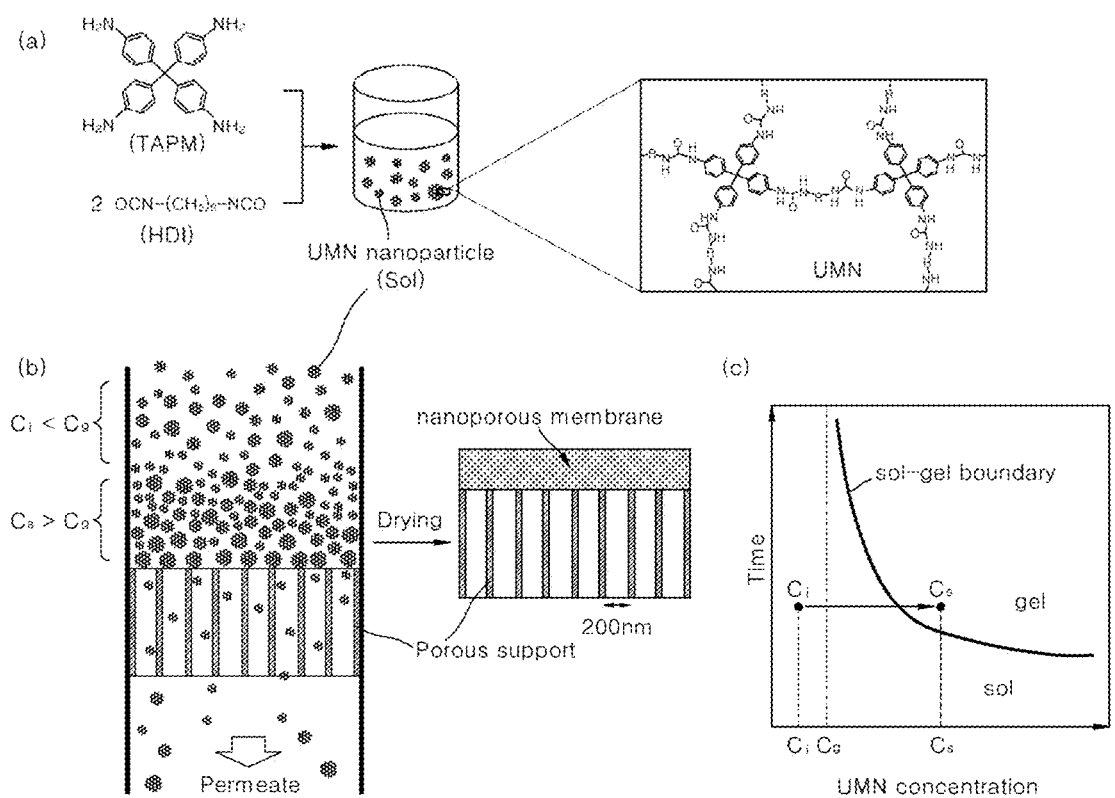
FIG. 1 is a schematic diagram showing a method of manufacturing a composite membrane according to the present invention.

Hereinafter, embodiments of the present invention will be described in detail. It should be understood that terms such as "first", "second" and the like may be used herein to distinguish components rather than to put any limits on the components.

One aspect of the present invention relates to a composite membrane including: (i) a porous support; and (ii) a monolithic active layer deposited on the porous support and having a 3-dimensionally interconnected pore structure having a size of 10 nm or less.

According to one embodiment, the monolithic active layer may include pores having a size of 2 nm to 10 nm and can remove small-size materials using such micropores. For example, the monolithic active layer can remove 3 nm-size cytochrome (Cyt) proteins and can completely remove albumin (BSA) and silica particles having a size that is similar to or greater than 3 nm.

According to another embodiment, the active layer may have a thickness of 4 μm or less.

Since separation performance of the composite membrane can be improved with decreasing thickness of the active layer, the active layer has a thickness of 4 μm or less, preferably 3 μm or less. In addition, the thinner active layer may be formed by decreasing the size of network nanoparticle in the organic sol.

According to a further embodiment, the monolithic active layer may have a 3-dimensionally interconnected network shape formed by polymerization of first and second monomers, each of which has two to four functional groups.

The monolithic active layer can exhibit improved solvent resistance and heat resistance due to the 3-dimensionally interconnected network shape formed at a molecular level.

According to yet another embodiment, the functional groups of the first monomer may be amino groups; the functional groups of the second monomer may be isocyanate, acyl halide, or ester groups; and at least one of the first and second monomers may have four functional groups.

The first monomer having two to four amino groups may be a $C_1$ to $C_{100}$ aliphatic compound substituted with two to four amino groups, or a C6 to $C_{100}$ aromatic compound substituted with two to four amino groups.

The second monomer having two to four isocyanate, acyl halide or ester groups may be a $C_1$ to $C_{100}$ aliphatic compound substituted with two to four isocyanate, acyl halide or ester groups, or a $C_6$ to $C_{100}$ aromatic compound substituted with two to four isocyanate, acyl halide or ester groups.

The first and second monomers may include, for example, compounds represented by Formulae 1 to 9.

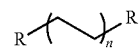

[Formula 1]

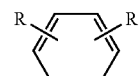

[Formula 2]

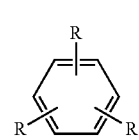

[Formula 3]

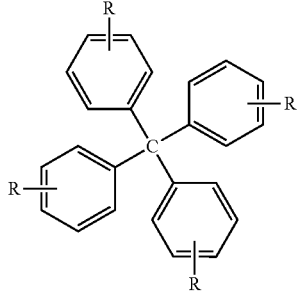

[Formula 4]

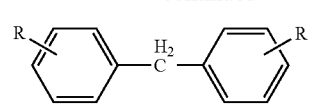

[Formula 5]

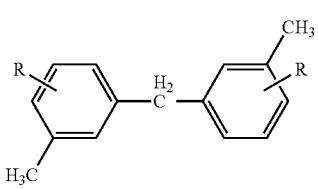

[Formula 6]

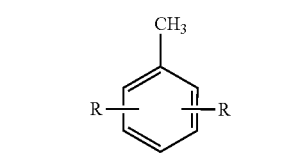

[Formula 7]

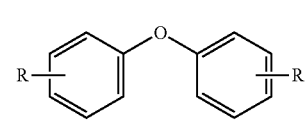

[Formula 8]

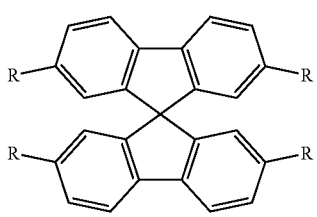

[Formula 9]

(where R is an amino, isocyanate, acyl halide, or ester group).

In addition, according to an embodiment, the first and second monomers may be a compound represented by Formula 10.

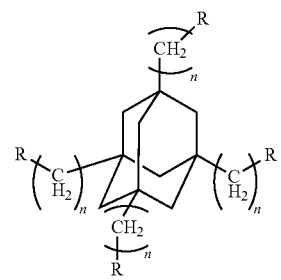

[Formula 10]

(where R is an amino, isocyanate, acyl halide, or ester group, and n is 0 or 1).

The first and second monomers are polymerized by reaction between the amino groups of the first monomer and the isocyanate, acyl halide, or ester groups of the second monomer, and the polymers produced by polymerization of the monomers are nano-particulate networks and they contain unreacted functional groups on their surfaces, thereby causing crosslinking between the particulate polymers when the solutions are concentrated. As a result, the tetrahedral monomer having four functional groups becomes a kind of crosslinking point to form a 3-dimensional organic network structure connected by strong covalent bonds, in other words, the monolithic active layer having a 3-dimensionally interconnected network shape at a molecular level, may be formed.

The organic network structure formed by polymerization between the first and second monomers has a large number of micropores and a high specific surface area due to 3-dimensional polymerization and crosslinking at a molecular level, and exhibits excellent solvent resistance and heat resistance due to high degree of covalent crosslinking.

In addition, the monomer having two to four amino groups may include, for example, tetrakis(4-aminopheyl) methane (TAPM), p-phenylene diamine (PDA), or 4,4'-oxydianiline (ODA), without being limited thereto.

Further, the monomer having two to four isocyanate groups may include, for example, hexamethylene diisocyanate (HDI), p-phenylenediisocyanate (PDI), or tetrakis(4-isocyanatophenyl)methane (TIPM), without being limited thereto.

According to yet another embodiment, the porous support may be formed of at least one selected from among polyimide, polyamide, polyamidehydrazide, polybenzoxazole, polyethylene terephthalate, polyethylene, polypropylene, polytetrafluoroethylene, polyaryleneethersulfone, and polyetheretherketone, and may include a wide range of porous supports of materials that are not dissolved by an organic solvent. That is, since permeation or coating of the network-nanoparticle-dispersed organic sol-containing solution as described below needs to be performed through the pores included in the porous support, it is desirable that the porous support be a porous support not dissolved in an organic solvent of the network-nanoparticle-dispersed organic sol-containing solution.

In addition, since the nanoparticle-dispersed organic sol-containing solution needs to permeate through the pores included in the porous support, it is desirable that the pores be large enough for the network-nanoparticle sols to pass therethrough.

Another aspect of the present invention relates to a method of manufacturing a composite membrane, which includes: (B) performing permeation or coating of a nanoparticle-dispersed organic sol containing solution on a porous support.

The method of manufacturing a composite membrane according to the present invention may be based on concentration polarization occurring when permeation or coating of the nanoparticle-dispersed organic sol-containing solution is performed on the porous support.

Specifically, when a concentration of the nanoparticle-dispersed organic sol, which remains or is coated on a surface of the porous support instead of permeating the porous support, gradually increases and reaches a gelation concentration (Cg) or more, a gel layer may be formed. Next, when the residual solvent is removed by drying the gel layer, pores are formed by reaction between the network nanoparticles, and the monolithic active layer having a 3-dimensionally interconnected structure by the pores is formed.

When the permeation method is used for the formation of active layer, it can be determined that the gel layer is formed, if the concentration of the active layer is measured as being a gelation concentration or more, or if permeability of the nanoparticle-dispersed organic sol-containing solution sharply decreases during real-time measurement of permeability thereof.

According to one embodiment, concentration polarization of the nanoparticle-dispersed organic sol-containing solution on the surface of the porous support may be promoted by applying pressure to the solution by performing permeation using a method selected from among dead-end flow filtration, cross flow filtration, and combinations thereof.

According to another embodiment, coating may be performed by a method selected from among casting, dip coating, spin coating, and spray coating.

According to a further embodiment, the method of manufacturing a composite membrane may include (A) obtaining the nanoparticle-dispersed organic sol-containing solution, before step (B).

Step (A) may include (a-1) forming the network-nanoparticle-dispersed organic sol by polymerizing first and second monomers, each of which has two to four functional groups, and (a-2) obtaining the network-nanoparticle-dispersed organic sol-containing solution by diluting the nanoparticle-dispersed organic sol with an organic solvent.

In step (a-1), when the first and second monomers, each of which has two to four functional groups, are polymerized, a polymerization solvent may be used in conjunction with the first and second monomers, and the nanoparticle-dispersed organic sol may be formed by performing polymerization using the polymerization solvent. The polymerization solvent may be selected from among N,N-dimethylformamide (DMF), dimethylacetamide (DMAc), N-methyl-2-pyrrolidone (NMP), dimethyl sulfoxide (DMSO), tetrahydrofuran (THF), and ethanol.

In step (a-2), dilution may be performed such that the concentration of the network-nanoparticle-dispersed organic sol-containing solution is less than the gelation concentration (Cg) by adjusting an amount of the organic solvent.

To prevent gel formation while permeation or coating of the netowork-nanoparticle-dispersed organic sol-containing solution is performed on the porous support, dilution may be performed using the organic solvent. For example, when the nanoparticle-dispersed organic sol is formed by polymerizing tetrakis(4-aminophenyl)methane (TAPM) and hexamethylene diisocyanate (HDI), which are used as the first and second monomers, respectively, since the gelation concentration (Cg) of the nanoparticle-dispersed organic sol is 0.03 w/v %, it is desirable that the nanoparticle-dispersed organic sol be diluted to the gelation concentration (Cg) using the organic solvent and then subjected to permeation or coating with respect to the porous support.

The organic solvent may be an organic solvent such as DMF, DMAc, NMP, DMSO, THF, and ethanol, without being limited thereto.

The thickness of the active layer and the size of the pores may be adjusted depending upon the size of the nanoparticles dispersed in the organic sol. As the size of the nanoparticles decreases, the thickness of the active layer and the size of the pores may also be decreased.

Although the network-nanoparticle-dispersed organic sol, which is prepared by polymerizing the first monomer having two to four amino groups and the second monomer having two to four isocyanate, acyl halide, or ester groups, may gelate as the degree of polymerization and the degree of crosslinking increase, since the gelation rate depends upon concentrations of the mixed monomers, the network-nanoparticle-dispersed organic solution may be controlled to be the sol state, which is an intermediate state before gelation, by appropriately adjusting a concentration of a monomer solution.

Thus, 3-dimensionally interconnected structure of the monolithic active layer included in the composite membrane may be controlled by the factors such as the polymerization time of the monomers in the process of manufacturing the organic sol, the properties of the manufactured monolithic structure of a 3-dimensionally interconnected network shape (properties of covalent bonding or physical bonding between networks), and the dilution concentration by the organic solvent. Therefore, the composite membrane having desired properties depending upon purposes may be selectively manufactured by appropriately adjusting the factors.

EXAMPLES

Hereinafter, the present invention will be described in more detail with reference to some examples. It should be understood that the following examples are not to be construed in any way as limiting the present invention. In addition, it is apparent that the present invention not presenting specific experimental results can be easily implemented by those of ordinary skill in the art based on disclosures of the present invention including the following examples.

Example 1

Manufacture of Composite Membrane

A composite membrane was manufactured in the same manner as shown in FIG. 1.

(1) Production of Network-nanoparticle-dispersed Organic Sol-containing Solution Using DMF as a polymerization solvent and using the same number of moles of tetrakis(4-aminophenyl)methane (TAPM) and hexamethylene diisocyanate (HDI), polymerization was performed at room temperature for 75 hours, whereby an organic sol, in which network-nanoparticles having a size distribution of 60 nm to 150 nm and an average size of 90 nm were dispersed, was polymerized to a concentration of 4 w/v %. The network-nanoparticle-dispersed organic sol is a urea-based molecular network (UMN) corresponding to a network structure, in which the nanoparticles have interconnected urea groups.

In order to produce the network-nanoparticle-dispersed organic sol into a solution having a concentration of less than a critical gelation concentration (Cg), that is, less than 0.03 w/v %, a 0.01 w/v % nanoparticle-dispersed organic sol-containing solution was produced by diluting the nanoparticle-dispersed organic sol with DMF.

(2) Formation of Gel Layer on Porous Support

The network-nanoparticle-dispersed organic sol-containing solution was permeated through a porous nylon membrane (porous nylon-6,6 membrane), which was used as a porous support with pores having an average size of 200 nm, by dead-end filtration method, thereby forming a gel layer of the network-nanoparticle-dispersed organic sol on the surface of the porous nylon membrane.

Figure 2:
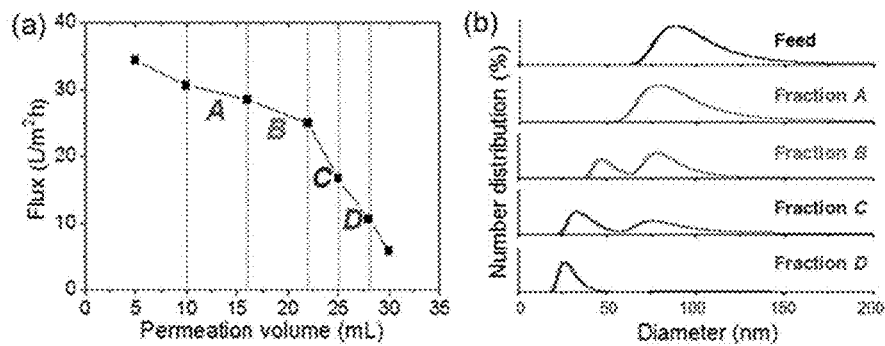
FIG. 2 shows (a) a graph depicting flux of a nanoparticulate network-dispersed organic solution permeating a porous support, and (b) a graph depicting size distribution of network nanoparticles passing through the porous support along with permeation time, upon formation of an active layer according to an embodiment of the present invention.

FIG. 2 shows (a) a graph depicting flux of a nanoparticle-dispersed organic sol-containing solution permeating a porous support, and (b) a graph depicting size distribution of nanoparticles passing through the porous support along with permeation time, upon formation of an active layer according to an embodiment of the present invention.

Referring to (a) in FIG. 2, it could be seen that a permeate flux of the nanoparticle-dispersed organic sol-containing solution decreased with increasing permeation volume of the nanoparticle-dispersed organic sol-containing solution after permeation through a porous nylon membrane corresponding to the porous support.

That is, the increase of the permeation volume means the lapse of permeation time, and it could be seen that the permeate flux of the nanoparticle-dispersed organic sol-containing solution permeating the porous nylon membrane decreased since more and more particles were accumulated on a surface of the porous nylon membrane with increasing permeation time.

In addition, referring to (b) in FIG. 2, it could be seen that, although the nanoparticles having a relatively large size permeated the porous nylon membrane in the early stage of permeation, the nanoparticles having a relatively small size permeated the porous nylon membrane as time passed. The size of the nanoparticles was confirmed by dynamic light scattering (DLS) measurement of the nanoparticle-dispersed organic sol-containing solution permeating the porous nylon membrane.

(3) Manufacture of Composite Membrane

The porous nylon membrane including the gel layer of the nanoparticle-dispersed organic sol formed thereon was dried at 50° C. for 1 hour, at 80° C. for 2 hours, and at 100° C. for 3 hours, thereby manufacturing a composite membrane.

Figure 3:
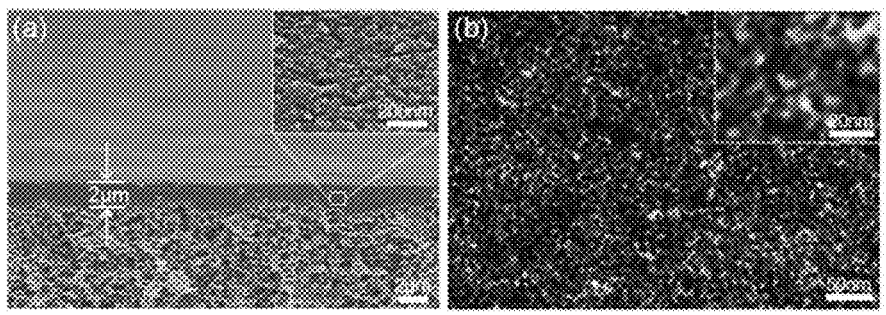
FIG. 3 shows (a) a scanning electron micrograph (SEM) and (b) a transmission electron micrograph (TEM) of an active layer included in a composite membrane of Example 1.

FIG. 3 shows (a) a scanning electron micrograph (SEM) and (b) a transmission electron micrograph (TEM) of an active layer included in a composite membrane of Example 1.

Referring to (a) and (b) in FIG. 3, it could be seen that the active layer included in the composite membrane manufactured in Example 1 was formed to a thickness of 2 μm and had a 3-dimensional network structure including a large number of pores.

Figure 4:
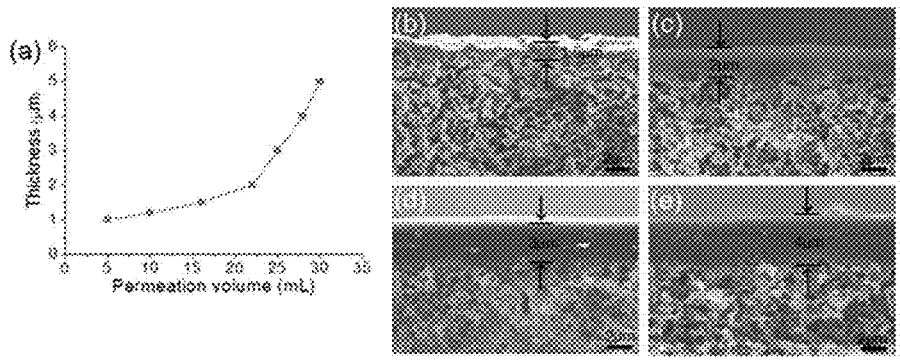
FIG. 4 shows a correlation between thickness of an active layer and permeation volume of a network-nanoparticle-dispersed organic solution permeating a porous support, when manufacturing a composite membrane according to the present invention.

FIG. 4 shows (a) a graph depicting a correlation between the thickness of a formed active layer and the volume of a nanoparticle-dispersed organic sol-containing solution permeated through the porous support in manufacturing the composite membrane according to the present invention, and (b) to (e) SEM images of cross-sections of the active layers formed in various thicknesses.

Referring to (a) in FIG. 4, it could be seen that the thickness of the formed active layer increased with increasing permeation volume of the network-nanoparticle-dispersed organic sol through the porous support.

Referring to (b) to (e) in FIG. 4, it could be seen that the active layers having thicknesses of 1.5 μm, 2 μm, 3 μm, and 4 μm, respectively, were formed on the porous support, depending upon the permeation volume of the nanoparticle-dispersed organic sol through the porous support.

Figure 5:
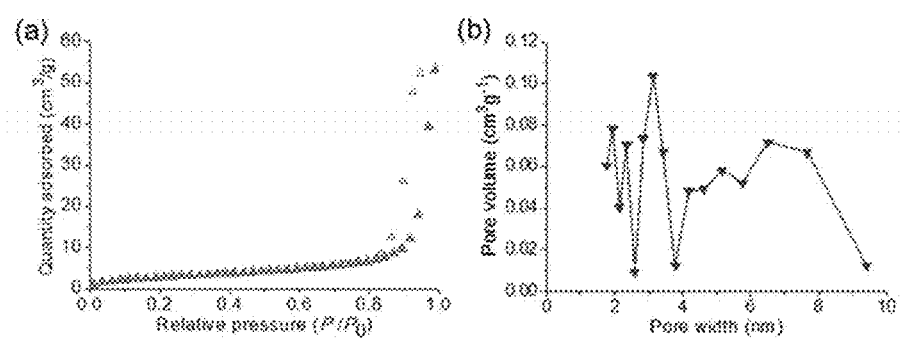
FIG. 5 shows graphs depicting measurement results of pore characteristics of the active layer included in the composite membrane of Example 1.

FIG. 5 shows graphs depicting measurement results of pore characteristics of the active layer included in the composite membrane of Example 1.

(a) in FIG. 5 shows an $N_2$ adsorption-desorption isothermal curve, and it could be seen that the active layer had mesopores (2 nm to 50 nm) as estimated by the $N_2$ adsorption-desorption analysis at a temperature of 77 K.

In addition, referring to (b) in FIG. 5, from measurement results of pore size distribution by the Barrett-Joyner-Halenda (BJH) method, it could be seen that the active layer contained pores having a size of 10 nm or less.

Figure 6:
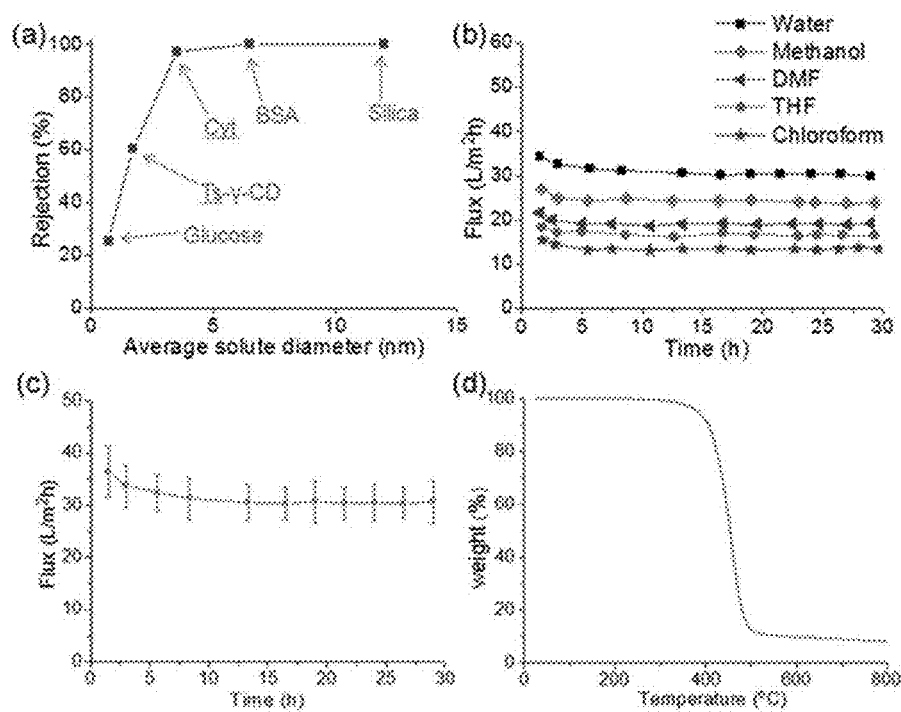
FIG. 6 shows graphs depicting measurement results of various properties of the composite membrane manufactured in Example 1.

FIG. 6 shows graphs depicting measurement results of various properties of the composite membrane manufactured in Example 1.

(a) in FIG. 6 is a graph depicting results obtained when glucose, mono-6-O-(p-toluenesulfonyl)-γ-cyclodextrin (Ts-γ-CD), cytochrome c (Cyt), bovine serum albumin (BSA), and silica nanoparticles, which were solutes having average sizes known in the art, were filtered through the composite membrane manufactured in Example 1 to measure separation performance of the composite membrane.

As a result, it could be confirmed that as much as 97% or more of Cyt having an average size of 3 nm based on the total weight of Cyt could be removed, and that BSA having an average size of 6 nm and the silica nanoparticles having an average size of 12 nm could be removed as much as nearly total amounts thereof.

In addition, from results of (b) in FIG. 6, it could be seen that, since the composite membrane of Example 1 exhibited a constant flux for a long period of time with respect to various organic solvents including water, methanol, DMF, THF, and chloroform, the composite membrane had solvent resistance.

Further, referring to (c) in FIG. 6, as a result of measuring water permeability of the composite membrane of Example 1 after refluxing the composite membrane in NMP for 30 hours, it could be confirmed that, since the flux of the composite membrane was constant for a long period of time and had no changes before and after reflux, the composite membrane exhibited solvent resistance and heat resistance under severe conditions.

Furthermore, (d) in FIG. 6 is a graph depicting results of thermal gravimetric analysis of the composite membrane manufactured in Example 1, and from the results, it could be seen that the composite membrane exhibited thermal stability up to 350° C.

As described above, the composite membrane according to the present invention includes the monolithic active layer having a 3-dimensionally crosslinked structure including pores having a size of 10 nm or less, had solvent resistance and heat resistance, and exhibited excellent separation performance since the composite membrane could remove nearly total amounts of Cyt, BSA and silica nanoparticles having average sizes of 3 nm or more. Therefore, it could be confirmed that the composite membrane according to the present invention had a possibility of being widely applied as a membrane to various fields.

In addition, since the composite membrane can be manufactured by a simple process by deriving concentration polarization of the nanoparticle-dispersed organic sol on the surface of the porous support and can be manufactured to a large area, reduction in manufacturing processes and cost reduction caused thereby can be achieved.

Although the present invention has been described with reference to some embodiments, it should be understood that various modifications, changes, alterations, and equivalent embodiments can be made by those skilled in the art without departing from the spirit and scope of the invention.

Therefore, the scope of the present invention should be defined only by the accompanying claims and equivalents thereof, and all modifications, changes and alterations derived from the accompanying claims and equivalents thereof will be construed as within the scope of the present invention.

What is claimed is:

1. A method of manufacturing a composite membrane, comprising:
   (A) obtaining a network-nanoparticle-dispersed organic sol-containing solution, and
   (B) performing permeation of the network-nanoparticle-dispersed organic sol-containing solution on a porous support,
   wherein the step (A) comprises:
      (A-1) forming the network-nanoparticle-dispersed organic sol by polymerizing first and second monomers, each of which has two to four functional groups; and
      (A-2) obtaining the network-nanoparticle-dispersed organic sol-containing solution by diluting the nanoparticle-dispersed organic sol with an organic solvent such that the network-nanoparticle-dispersed organic sol-containing solution has a concentration of less than a gelation concentration (Cg) thereof, and
   wherein
      the functional groups of the first monomer comprises an amino group,
      the functional groups of the second monomer comprises an isocyanate group, an acyl halide group, an ester group, or combinations thereof,
      at least one of the first and second monomers has four functional groups, and
      the permeation of the network-nanoparticle-dispersed organic sol-containing solution is performed until a gel layer of the network-nanoparticle-dispersed organic sol is formed on a surface of the porous support due to concentration polarization of the network-nanoparticle-dispersed organic sol on the surface of the porous support by applying pressure to the solution.

2. The method according to claim 1, wherein permeation is performed by a method selected from the group consisting of dead-end flow filtration, cross flow filtration, and combinations thereof.

3. The method according to claim 1, further comprising:
   (C) performing drying, after step (B).

* * * * *